US006552683B2

(12) United States Patent
Voyer

(10) Patent No.: US 6,552,683 B2
(45) Date of Patent: Apr. 22, 2003

(54) METHOD OF OBTAINING A TRANSMISSION GAIN FUNCTION

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/982,800

(22) Filed: Oct. 22, 2001

(65) Prior Publication Data
US 2002/0075967 A1 Jun. 20, 2002

(30) Foreign Application Priority Data

Oct. 31, 2000 (FR) .............................. 00 14361

(51) Int. Cl.$^7$ .................. H01Q 3/26; H04B 17/02; H04B 1/06; H04B 7/00
(52) U.S. Cl. .................. 342/378; 342/372; 455/135; 455/278.1; 455/245.1; 455/246.1
(58) Field of Search ................ 342/368–384; 455/501, 135, 278.1, FOR 107, 234.1, 245.1, 246.1

(56) References Cited

U.S. PATENT DOCUMENTS 5,434,578 A * 7/1995 Stehlik ............... 342/380
6,218,988 B1 * 4/2001 Maruta ............... 342/378
6,441,784 B1 * 8/2002 Flore et al. .......... 342/377

FOREIGN PATENT DOCUMENTS

EP          0 999 658        5/2000
WO          WO 00/36764      6/2000

OTHER PUBLICATIONS

J. Goldberg, et al., IEEE, vol. Conf. 47, pp. 632–636, XP–000736684, "Downlink Beamforming For Cellular Mobile Communications", May 4–7, 1997.

* cited by examiner

Primary Examiner—Thomas H. Tarcza
Assistant Examiner—Fred H Mull
(74) Attorney, Agent, or Firm—Oblon, Spivak, McClelland, Maier & Neustadt, P.C.

(57) ABSTRACT

Method of obtaining a transmission gain function for an array of antennae communicating to a telecommunication terminal. The method includes determining a first weighting vector $b_u$ maximizing on reception by the array a ratio $(C/(I_u+N_u))_u$ of a received signal coming from the telecommunication terminal to a noise plus interference disturbing an uplink channel, and calculating from the first weighting vector $b_u$ a second weighting vector $b_d$ maximizing on reception by the telecommunication terminal a ratio $(C/(I_d+N_d))_d$ of a received signal coming from the array to a noise plus interference disturbing the downlink channel. The second weighting vector is in the form of a matrix product including a first noise matrix $D_u$ which is a function of a power of the first isotropic noise and/or a power of the first directional noise and a second noise matrix $D_d$ which is a function of a power of the second isotropic noise and/or a power of the second directional noise.

11 Claims, 3 Drawing Sheets

METHOD OF OBTAINING A TRANSMISSION GAIN FUNCTION

BACKGROUND OF THE INVENTION

1. Field of the Invention

The present invention concerns in general terms a method of obtaining a gain function in transmission mode. More particularly, the present invention relates to a method of obtaining an antenna gain in transmission mode for a base station in a mobile telecommunication system. It makes it possible to obtain an antenna gain in transmission mode from an antenna gain in reception mode.

2. Discussion of the Background

The formation of channels or the elimination of interfering signals is well known in the field of narrow-band antenna processing. Each uses an array of antennae, generally linear and uniform (that is to say with a constant pitch) and a signal weighting module. More precisely, if it is wished to form a channel in reception mode, the signals received by the different antennae are weighted by a set of complex coefficients before being added. Conversely, if it is wished to form a channel in transmission mode, the signal to be transmitted is weighted by a set of complex coefficients and the signals thus obtained are transmitted by the different antennae.

FIG. 1 illustrates a known device for obtaining an antenna gain in transmission and reception. The device comprises an array of antennae $(10_0),(10_1), \ldots ,(10_{N-1})$, a transmission weighting module (11) and a reception weighting module (15). The signals received by the different antennae, $(x_i)$, $i=0 \ldots N-1$ are weighted at $(13_0),(13_1), \ldots ,(13_{N-1})$ by a set of complex coefficients $(b_{ui})$, $i=0, \ldots , N-1$ before being added at (14) in order to give a signal $R_u$. Conversely, a signal to be transmitted $S_d$ is weighted as $(12_0)$, $(12_1) \ldots ,(12_{N-1})$ by a set of complex coefficients $(b_{di})$, $i=0, \ldots , N-1$, before being transmitted by the different antennae.

If the vector of the received signals and the vector of the weighting coefficients are respectively denoted $\bar{x}=(x_0, x_1, \ldots ,x_{N-1})^T$ and $\bar{b}_u=(b_{u0},b_{u1}, \ldots ,b_{uN-1})^T$, it is possible to write:

$$R_u = \overline{b_u}^T \cdot \overline{x} \quad (1)$$

The complex gain (or the complex gain function of the antenna) in reception mode can be written:

$$G(\overline{b_u}, \theta) = \overline{b_u}^T \cdot \overline{e_{u\theta}} = \sum_{i=0}^{N-1} b_{ui} \cdot \exp(-j\varphi_i) \quad (2)$$

where $\overline{e_{u\theta}}$ represents the vector $\bar{x}$ corresponding to a flat wave arriving at an angle of incidence $\theta$, and $$\varphi_i = (2\pi d/\lambda).i. \sin(\theta) = (2\pi df/c).i. \sin(\theta) \quad (3)$$

is the difference in operation between consecutive antennae for a uniform linear array with a pitch d, $\lambda$ and $f$ being respectively the wavelength and the frequency of the flat wave in question; and $$\varphi_i = 2\pi R\Delta\theta/\lambda \sin(\theta-\theta_i) = 2\pi Rf\Delta\theta/c \sin(\theta-\theta_i) \quad (4)$$

for a circular array where $\theta_i$ is the angle between a reference axis and the normal to the antenna of index i, R the radius of curvature of the array, $\Delta\theta$ is the angular difference between two consecutive antennae in the array.

Likewise, the complex gain (or the complex gain function) in transmission can be written:

$$G(\overline{b_d}, \theta) = \overline{b_d}^T \cdot \overline{e_{d\theta}} = \sum_{i=0}^{N-1} b_{di} \cdot \exp(j\varphi_i) \quad (5)$$

with the same conventions as those adopted above and where $\overline{e_{d\theta}}$ is the vector $\bar{x}$ corresponding to a flat wave transmitted in the direction $\theta$. The weighting vectors in reception and transmission mode will be called respectively $\overline{b_u}$ and $\overline{b_d}$.

When the array of antennae is functioning in reception mode at a given frequency, different known methods, notably the Wiener filtering method, make it possible to determine the weighting vector $\overline{b_u}$ which maximises the signal to noise ratio. In a mobile telecommunications system, the array of antennae of a base station receives signals transmitted by a plurality of mobile terminals. In the context of a transmission in CDMA (Code Division Multiple Access) mode, the signals transmitted by the different mobile terminals are separated by means of the use of orthogonal codes on transmission and filters adapted to these codes on reception. In practice, however, the separation of the different signals received is not perfect. For an uplink between a given mobile terminal and the base station which serves it, the criterion to be maximised is then the ratio of signal to noise plus interference, the latter being due to the signals transmitted by the other mobile terminals. Likewise, the downlink between a base station and a given mobile terminal is disturbed not only by the background noise but by the interference due to the signals transmitted by the said base station to other mobile terminals. Though it is relatively easy to optimise the weighting vector in reception mode, $\overline{b_u}$, by estimating the uplink channel and the density of interference at the base station, it is quite different with regard to the optimisation of the weighting vector in transmission mode, $\overline{b_d}$. This is because the estimation of the downlink channel and the density of interference cannot be made directly at the base station and a transmission of this information by the mobile terminals is necessary. However, this transmission of information consumes conveyance resources on the uplink, which can be disadvantageous, notably in the case of rapid variations in the channel transfer function, for example when the mobile terminal is moving at high speed.

SUMMARY OF THE INVENTION

The aim of the invention is to propose a method of determining the transmission weighting vector, $\overline{b_d}$, optimising the ratio of signal to noise plus interference on the downlink and requiring the transmission only of a small quantity of information on the uplinks.

To this end, the invention is defined by a method of obtaining a transmission gain function by means of an array of antennae and a weighting of the signals received or to be transmitted by vectors $(\bar{b})$ of N complex coefficients, referred to as weighting vectors, N being the number of antennae in the array, the array transmitting, to a telecommunication terminal on a transmission channel, referred to as the downlink channel, a downlink transmission signal $(S_d)$ and the said terminal transmitting to the said array on a transmission channel, referred to as the uplink channel, an uplink transmission signal $(S_u)$, the said uplink channel being disturbed by a first isotropic noise (N) and/or a first directional noise, referred to as the uplink interference $(I_u)$, the said downlink channel being disturbed by a second isotropic noise (N') and/or a second directional noise, referred to as the downlink interference ($I_d$), a first weighting vector ($\overline{b}_u$) having been determined in order to maximise, on reception by the array, the ratio $(C/(I+N))_u$ of the received signal coming from the said terminal to the noise plus interference disturbing the said uplink channel, a second weighting vector ($\overline{b}_d$) maximising, on reception by the terminal, the ratio $(C/(I+N))_d$ of the received signal coming from the network to the noise plus interference disturbing the downlink channel, is calculated from the said first weighting vector in the form of a matrix product comprising a first noise matrix ($D_u$) which is a function of the power of the first isotropic noise and/or the power of the first directional noise and a second noise matrix ($D_d$) which is a function of the power of the second isotropic noise and/or the power of the second directional noise.

According to one embodiment, the first weighting vector ($\overline{b}_u$) is obtained for a first working frequency ($f_u$) of the array and the second weighting vector ($\overline{b}_d$) is obtained for a second working frequency ($f_d$) of the array.

Advantageously, a gain function being represented by a vector, referred to as the gain vector ($\overline{G}$), of M complex samples of the said gain function taken in M distinct directions (k), the said gain vector being expressed as the product of a weighting vector ($\overline{b}$) and a transformation matrix dependent on the working frequency of the array, the second weighting vector $\overline{b}_d$ is obtained from the first weighting vector $\overline{b}_u$ by:

$$\overline{b}_d = H_d^+ \cdot D_d^2 \cdot D_u^2 \cdot H_u \overline{b}_u$$

where $H_u$ is the transformation matrix at the frequency ($f_u$), $H_d^+$ is the pseudo-inverse matrix of the matrix $H_d$, the transformation matrix at the frequency ($f_d$), $D_u$ is the first noise matrix and $D_d$ is the second noise matrix.

The first noise matrix can be expressed as a diagonal matrix of size M×M and of components $\sqrt{\sigma_{uk}^2 + \gamma_u N_0 / I_u}$ where $\sigma_{uk}^2$ is the power of the uplink interference in the direction k, $I_u$ is the total power of the uplink interference, and $N_0$ is the power of the first isotropic noise, $\gamma_u = 1/\|\overline{G}_u\|^2$ where $\overline{G}_u = H_u \overline{b}_u$.

In a similar manner, the second noise matrix can be expressed as a diagonal matrix of size M×M and of components $\sqrt{\sigma_{dk}^2 + \gamma_d N'_0 / I_d}$ where $\sigma_{dk}^2$ is the power of the downlink interference in the direction k, $N'_0$ is the power of the second isotropic noise, $\gamma_d = 1/\|\overline{C}_d\|^2$ where $\overline{C}_d$ is a vector consisting of the samples of the function of the transfer function of the downlink channel taken in the said M directions and $I_d$ is the total power of the downlink interference.

If the array transmits on a plurality of downlink channels a plurality of transmission signals to a plurality of telecommunication terminals and receives from them a plurality of transmission signals transmitted on a plurality of uplink channels and if each downlink channel j relating to a terminal j of the said plurality is associated with a second weighting vector $\overline{b}_d(j)$, the second noise matrix relating to the downlink channel j is a diagonal matrix of size M×M and of components $\sqrt{\sigma_{dk}^2(j) + \gamma_d(j) \cdot N'_0 / I_d(j)}$ where $\sigma_{dk}^2(j)$ is the power of the downlink interference for the downlink channel j in the direction k, $\gamma_d(j)$ is a coefficient characterising the power transfer on the downlink channel j, $N'_0$ is the power of the second isotropic noise, and $I_d$ is the total power of the downlink interference.

The downlink interference power in the direction k, $\sigma_{dk}^2(j)$, can be estimated according to the power of the transmitted signals $S_d(j')$ on the downlink channels j' distinct from j by:

$$I_d(j) \cdot \sigma_{dk}^2(j) = \beta_d(j) \cdot \sum_{j' \neq j} |S_d(j')|^2 \cdot |g_{dk}(j')|^2$$

where $\beta_d(j)$ is an orthogonality coefficient of the downlink channel j and $g_{dk}(j')$ is the kth coefficient of the gain vector $\overline{G}_d(j') = H_d \overline{b}_d(j')$ relating to the downlink channel j'.

Advantageously, the said coefficient $\beta_d(j)$ is estimated from a coefficient characterising the orthogonality of the uplink channel j.

The coefficient $\gamma_d(j)$ can be transmitted to the array by the terminal j on the associated uplink channel.

The invention is also defined by a device adapted to implement the method which has just been disclosed.

BRIEF DESCRIPTION OF THE DRAWINGS

The characteristics of the invention mentioned above, as well as others, will emerge more clearly from a reading of the following description given in relation to the accompanying figures, amongst which.

DESCRIPTION OF THE PREFERRED EMBODIMENTS

Figure 1:
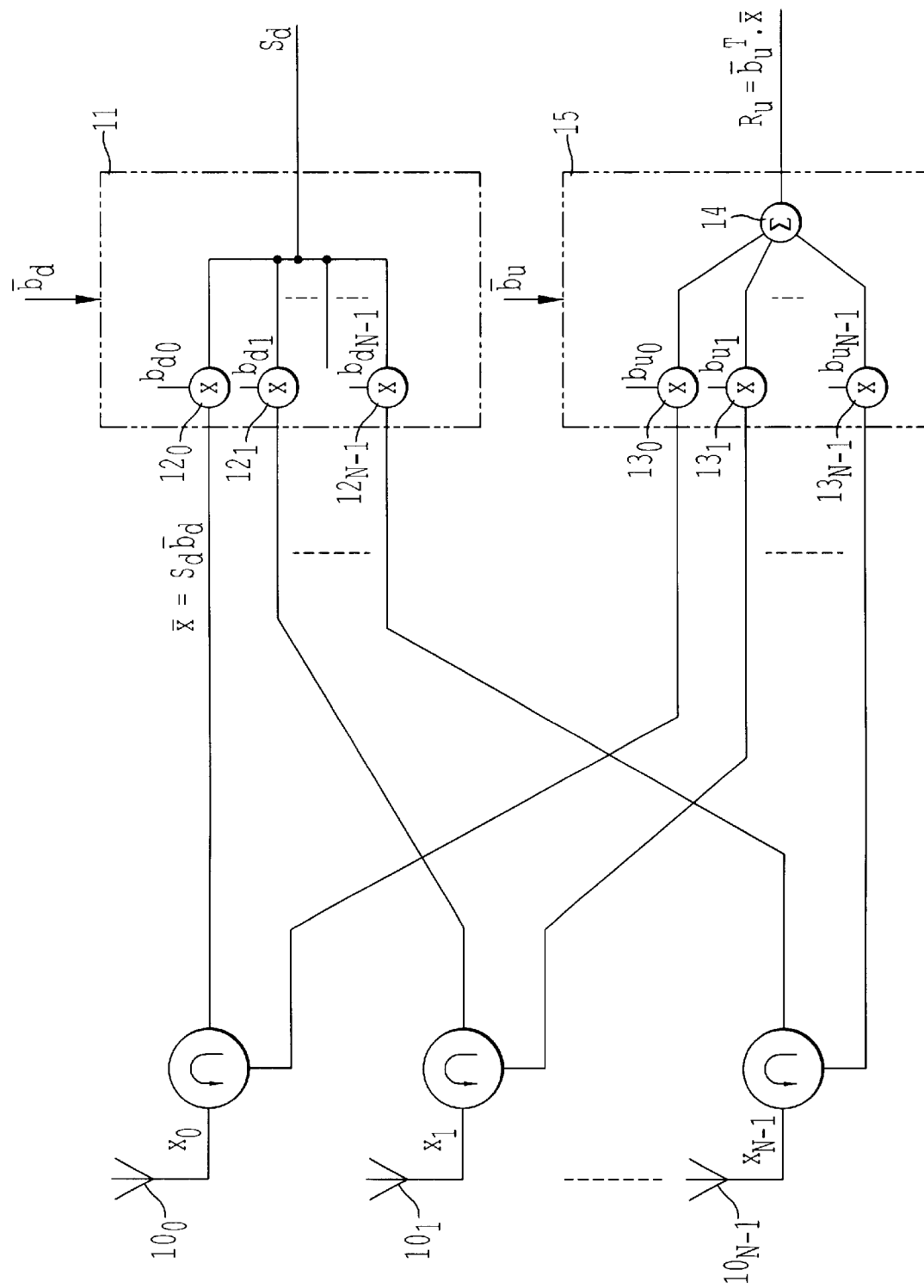
FIG. 1 depicts schematically a known device for obtaining an antenna gain function.

A first general idea at the basis of the invention is to sample the transmission and reception gain functions in order to construct transmission and reception gain vectors. As will be shown, optimum weighting vectors, in terms of ratio of signal to noise plus interference, can then be obtained from transmission and reception gain vectors according to matrix equations.

A second general idea at the basis of the invention is to obtain a transmission weighting vector, optimum in terms of ratio of signal to noise plus interference obtained, according to the reception gain weighting vector assumed itself to be optimum.

It will shown first of all that the weighting vectors can be obtained from a series of samples of the corresponding gain function.

Consider first of all a linear uniform array, formed by N antennae spaced apart by a pitch d and operating at the frequency $f$. The antennae gain function $G_0(\theta)$, obtained in the absence of any weighting (that is to say with $\overline{b}_0 = (1,1,\ldots,1)^T$):

$$|G_0(\theta)| = \frac{\sin(N\varphi/2)}{\sin(\varphi/2)} \text{ with } \varphi = 2\pi f d/c \cdot \sin\theta \qquad (6)$$

This function has zeros for the values $\phi_k = 2k\pi/N$, k a non-zero integer such that $\phi_k \in [-\pi,\pi[$, that is to say in the directions for which $\sin\theta_k = k \cdot c/Nfd$, when this expresssion has a direction. The phase difference between two consecutive zeros in the gain diagram is constant and is equal to $\Delta\phi = 2\pi/N$. The angular difference between two consecutive zeros of the diagram varies in terms of Arcsin., a function whose derivative is increasing on [−1,1] and is therefore minimum for the angular difference between the first and second zeros. It is therefore bounded by $\Delta\theta_{min}=c/Nfd$ if N is sufficiently great. It will be assumed that the frequencies used are less than $f_0$ where $f_0$ is the natural frequency of the array. It can be concluded from this that the spectrum of the function $G_0(\theta)$ has a support bounded by $1/\Delta\theta_{min}=N/2$.

In more general terms, let $G(\theta)$ be the antenna gain function obtained by means of a weighting vector $\bar{b}$. G can be expressed as the Fourier transform (FT) (in reception) or the inverse Fourier transform (in transmission) of the complex weighting distribution of the antenna, namely:

$$b(x) = \sum_{i=0}^{N-1} b_i \cdot \delta(x - x_i)$$

with $x_i$=i.d; this gives: $G_u(\theta)=B(\sin\theta)$ with $$B(u) = \int_{-\infty}^{+\infty} b(x)\exp(-j2\pi ux/\lambda)\,dx$$

and likewise $G_d(\theta)=B'(\sin\theta)$ with $$B'(u) = \int_{-\infty}^{+\infty} b(x)\exp(j2\pi ux/\lambda)\,dx.$$

The function b(x) being bounded by N.d, the difference between two zeros of the function B or B' is at least $\lambda/N.d$ and therefore all the more so 2/N. Given the increase in the derivative of the function Arcsin. the minimum difference between two zeros of the function G is 2/N. The function G therefore has a spectrum bounded by N/2.

According to the Shannon sampling theorem, it is concluded from this that it is possible to reconstitute the function $G(\theta)$ if sampling is carried out at a frequency greater than the Nyquist frequency, that is to say N. In other words, for an angular range $[-\pi/2,\pi/2]$, a minimum of $M>\pi.N$ samples are necessary, where M is an integer. In practice K.N samples can be taken with K integer, $K\geq 4$.

For a circular array, it can be shown that $1/\Delta\theta_{min}=N$ and the angular range being $[-\pi,\pi]$, M ($M>\pi.N$ and M integer) angularly equidistributed samples also suffice to reconstitute the function $G(\theta)$.

In the general case of the sampling of any gain function $G(\theta)$, it is necessary first to filter $G(\theta)$ by means of an anti-aliasing filter before sampling it. It then suffices to take M samples of the diagram filtered over the entire angular range in order to reconstitute the filtered diagram.

The samples of a gain function, possibly filtered by anti-aliasing filtering, if necessary, will be denoted $g_k$, k=0, ... ,M−1 that is to say $g_k=G'(\theta_k)$ where the instances of $\theta_k$ are M angles equidistributed over $[-\pi/2,\pi/2]$ or $[-\pi,\pi]$ and where it is assumed that G' was the filtered version of the reference complex diagram.

It is now possible to define a linear application, $h_s^f$ of $C^N$ in $C^M$ which makes the vector $h_s^f(\bar{b})=\bar{G}=(g_0,g_1,\ldots,g_{M-1})^T$ where $g_k=G(\bar{b},\theta_k)$ correspond to any weighting vector $\bar{b}$. The image of $C^N$ by $h_s^f$ is a vector sub-space of $C^M$ with a dimension at most equal to N, which will be denoted $\text{Im}_f$. If a base of $C^N$ is chosen, for example the canonical base, and a base of $C^M$, it is possible to express the linear application $h_s^f$ by a matrix $H_f$ of size M×N which is at most of rank N.

Let $\bar{G}$ be any gain vector corresponding to a sampled gain function. Seek the vector $\bar{b}$ such that $h_s^f(\bar{b})$ is as close as possible to $\bar{G}$ in the sense of a certain metric. There will be taken as a norm the Euclidian norm on $C^M$, namely $$\|\bar{G}\|^2 = \sum_{k=0}^{M-1} |g_k|^2.$$

If it exists, the sought-for vector $\bar{b}$ is then such that $h_s^f(\bar{b})=\bar{G}_p$ where $\bar{G}_p$ is the orthogonal projection of the vector $\bar{G}$ onto $\text{Im}_f$. If the matrix $H_f$ is of rank N, the sought-for vector $\bar{b}$ exists and can be written:

$$\bar{b}=H_f^+.\bar{G} \qquad (7)$$

where $H_f^+=(H_f^{*T}.H_f)^{-1}.H_f^{*T}$ is the pseudo-inverse matrix of the matrix $H_f$ with $H_f^{*T}$ a conjugate transpose of the matrix $H_f$.

In order to express the matrix $H_f$, it is necessary to agree on a base of the starting space and a base of the arrival space. It is possible to choose as the base of $C^M$ the canonical base and as a base of $C^N$ a base adapted to the description of the flat waves of frequency $f$. Consider the distinct vectors $\bar{e}_k$, k=0, ... ,N−1, such that $\bar{e}_k=(e_{k,0},e_{k,1},\ldots,e_{k,N-1})^T$ with $$e_{k,i} = \exp\left(j\cdot\frac{2\pi fd}{c}\cdot i\cdot\sin\theta_k\right) = \exp(j\pi\cdot\eta\cdot i\cdot\sin\theta_k)$$

with $\eta=f/f_0$ and where the instances of $\theta_k$ belong to the interval $[-\pi/2,\pi/2]$. The vectors $\bar{e}_k$ are the weighting vectors of the array making it possible to form beams in the directions $\theta_k$. The vectors $\bar{e}_k$ form a base if the determinant of the coordinates of the instances of $\bar{e}_k$ in the canonical base of $C^N$ is non-zero. This determinant is a Vandermonde determinant which is equal to $$\prod_{p\neq q}(\exp(j\varphi_p)-\exp(j\varphi_q))$$

with $\phi_k=\pi\eta\sin\theta_k$. This determinant is cancelled out if and only if there are two angles $\theta_p$ and $\theta_q$ such that $\sin\theta_p-\sin\theta_q=2/\eta$. In other words, for $\eta<1$ the N vectors $\bar{e}_k$ always form a base and for $\eta=1$ only the case $\theta_p=-\theta_q=\pi/2$ is excluded. The directions can, for example, be chosen so as to be equally distributed, that is to say such that $\theta_k=k\pi/N$ with k=−(N−1)/2, ... ,0, ... ,(N−1)/2. In this case, the matrix $H_f$ has as its components:

$$H_{pq} = \sum_{i=0}^{N-1}\exp(j\pi\eta\cdot i\cdot\sin(p\pi/N))\exp(-j\pi\eta\cdot i\cdot\sin(q\pi/M))$$

or:

$$H_{pq} = \sum_{i=0}^{N-1}\exp(j\pi\eta\cdot i\cdot[\sin(p\pi/N)-\sin(q\pi/M)]) = \qquad (8)$$

$$\exp(j(N-1)\Psi_{pq}/2)\cdot\frac{\sin(N\Psi_{pq}/2)}{\sin(\Psi_{pq}/2)}$$

with $\Psi_{pq}=\pi\eta(\sin(p\pi/N)-\sin(q\pi/M))$.

Alternatively, it is possible to choose as a starting base another base adapted to the frequency $f$, the one formed by the vectors $\bar{e}'_k$, such that $e'_{k,i}=\exp(j\pi.\eta.i.\sin\theta_k)$ with $\sin\theta_k=2k/\eta N$ and k=−(N−1)/2, ... ,0, ... ,(N−1)/2. These vectors exist if $|\sin\theta_k|\leq 1$, $\forall k$, that is to say for $\eta>1-1/N$, and in this case the vectors $\bar{e}'_k$ form a base which has the advantage of being orthogonal.

Alternatively, it is possible to choose as the starting base the canonical base of $C^N$, which has the advantage of not depending on the frequency. In this case, the matrix $H'_f$ expressed in this base is written:

$$H'_f = H_f T^{-1} \quad (9)$$

where T is the matrix of the coordinates of $\bar{e}_k$ in the canonical base, that is to say $T_{pp'} = \exp(j\pi p \sin(p'/N))$. It was seen above that this matrix had a non-zero Vandermonde determinant and was consequently not reversible.

Assume now that it is sought to approximate a gain function obtained at a first frequency $f_1$, $f_1 \leq f_0$ and denote the vector of the samples associated with this gain function $\overline{G_1} = h_s^{f_1}(\overline{b_1})$. Let a second working frequency be $f_2$, $f_2 \leq f_0$. $\overline{G_1}$ belonging to $C^M$, if the matrix $H_{f_2}$ is of rank N, it is possible to find a vector $\overline{b_2}$ such that $h_s^{f_2}(\overline{b_2})$ is the projection of $h_s^{f_1}(\overline{b_1})$ onto $\mathrm{Im} f_2$. The vector $\overline{b_2}$ is obtained by means of the matrix equation:

$$\overline{b_2} = H_{f_2}^+ \cdot H_{f_1} \overline{b_1}. \quad (10)$$

This equation makes it possible in particular to obtain, at a second working frequency, a sampled gain diagram which is as close as possible to the one, referred to as the reference, obtained at a first working frequency.

Equation (10) applies advantageously to the array of antennae of a base station in a mobile telecommunication system operating in FDD (Frequency Division Duplex) mode. In such a system, a frequency $f_d$ is used on the downlinks and a frequency $f_u$ distinct from $f_d$ is used on the uplinks. Equation (10) then makes it possible to directly obtain the weighting vector on transmission $\overline{b_d}$ from the weighting vector on reception $\overline{b_u}$ $$\overline{b_d} = H_d^+ \cdot H_u \overline{b_u} \quad (11)$$

where there has been noted: $H_d = H_{fd}$ and $H_u = H_{fu}$.

Equation (11) makes it possible, as has been seen, to obtain, at the transmission frequency $f_u$, a sampled gain diagram which is as close as possible to a reference diagram obtained at the reception frequency $f_d$. However, the interference profile, that is to say the angular distribution of the power of the interference, is not necessarily the same on the downlink channel as on the uplink channel. This is because the directions of the interfering sources are not necessarily identical in transmission and reception. Consequently, though the reception gain diagram is optimum for a reception interference profile, it will not necessarily be so for a transmission interference profile. As will be shown later, if the transmission and reception interference profiles differ, equation (11) must be modified in order to take account of this difference.

Figure 2:
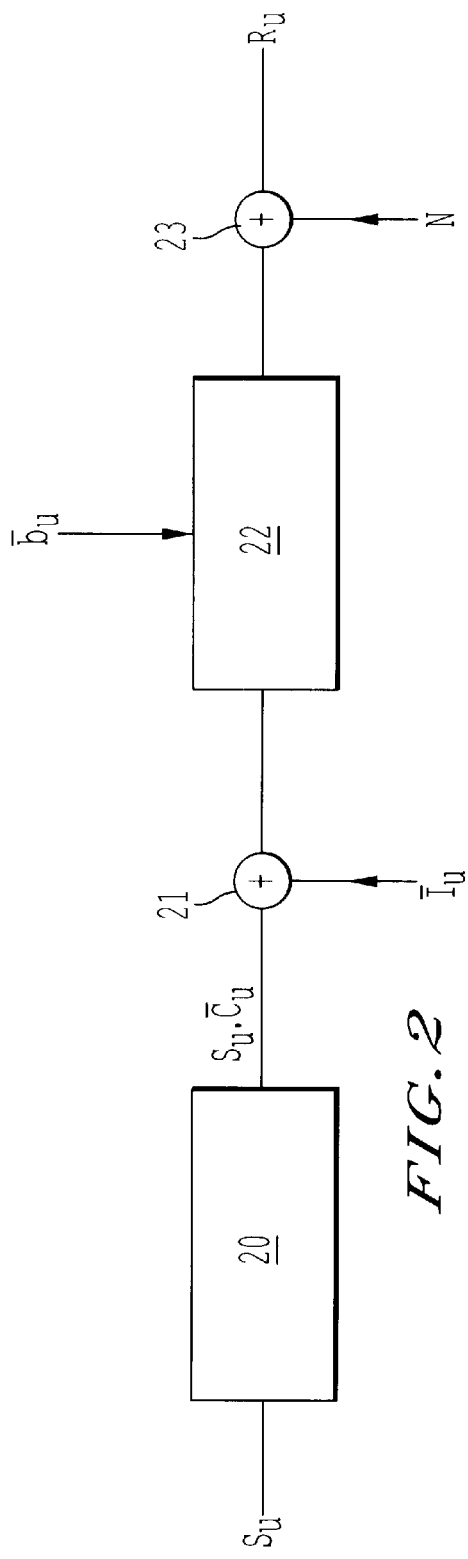
FIG. 2 depicts schematically an uplink transmission channel in a mobile telecommunication system.

FIG. 2 depicts the assembly consisting of the uplink channel (20), the array of antennae (22) and the reception weighting module (23). The effect of the noise has been represented by the addition (21) of a directional noise $\bar{I}_u$ due to the interfering signals, and at (24) an isotropic centred white Gaussian background noise N.

Just as the gain function can be represented by a gain vector, the channel can be modelled by a dimension vector M, defined as the angular sampling of the transfer function of the channel in the directions $\theta_k$, $k = 0, \ldots, M-1$ and denoted $\overline{C}_u = (c_{u0}, c_{u1}, \ldots, c_{uM-1})^T$. This vector has P amongst M non-zero coefficients, where P is the number of channel propagation paths. For these P coefficients $c_{uk}$, $c_{uk} = \alpha_{uk} \cdot \exp{-j(2\pi f_u \cdot L_{uk}/c + \phi_{uk})}$ where $L_{uk}$ is the length of the path concerned, $\alpha_{uk}$ the coefficient of attenuation of the signal propagating along the said path and $\phi_{uk}$ the polarisation of the incident signal.

The signal $R_u$ received by the base station can be written:

$$R_u = \overline{G}_u^T \cdot (S_u \cdot \overline{C}_u + \overline{I}_u) + N \quad (12)$$

where $\overline{G}_u$ is the reception gain vector and $S_u$ is the signal transmitted by the mobile terminal.

The ratio of signal to noise plus interference is:

$$(C/(I+N))_u = \frac{E(|\overline{G}_u^T \cdot S_u \overline{C}_u|^2)}{E(|\overline{G}_u^T \cdot \overline{I}_u|^2) + E(|N|^2)} = \frac{P_u |\overline{G}_u^T \cdot \overline{C}_u|^2}{N_0 + I_u \cdot \sum_{k=0}^{M-1} \sigma_{uk}^2 |g_{uk}|^2} \quad (13)$$

where $P_u$ is the power of the signal $S_u$, $N_0$ is the power of the background noise and $\overline{I}_u = \sqrt{I_u} \overline{I}_u^0$ where $\overline{I}_u^0$ is the standardised vector whose components are assimilated to standardised centred Gaussian random variables $N(0, \sigma_{uk}^2)$ that is to say such that $$\sum_{k=0}^{M-1} \sigma_{uk}^2 = 1$$

and where $I_u = E(\|\overline{I}_u\|^2)$ is the total power of the directional noise (that is to say of the interference on the uplink channel). It was assumed in (13) that the isotropic noise was independent of the directional noise.

Expression (13) can then be written:

$$(C/(I+N))_u = \frac{P_u}{I_u} \cdot \frac{|\overline{\Lambda}_u^T \overline{\Omega}_u|^2}{\|\overline{\Lambda}_u\|^2} \quad (14)$$

where $\overline{\Omega}_u = D_u^{-1} \cdot \overline{C}_u$, $\overline{\Lambda}_u = D_u \overline{G}_u$ and $D_u = \mathrm{Diag}(\sqrt{\sigma_{uk}^2 + \gamma_u N_0/I_u})$ with $\gamma_u = 1/\|\overline{G}_u\|^2$. Expression (14) is maximal for $\overline{\Lambda}_u = \overline{\Omega}_u^*$ and therefore for:

$$\overline{G}_u = D_u^{-1} \overline{\Omega}_u^* = D_u^{-2} \cdot \overline{C}_u^*. \quad (15)$$

The reception weighting vector, $\overline{b}_u$, optimum in the sense of the maximisation of the ratio of signal to noise plus interference on the channel, can then be expressed:

$$\overline{b}_u = H_u^+ \cdot D_u^{-1} \overline{\Omega}_u^* = H_u^+ \cdot D_u^{-2} \overline{C}_u^* \quad (16)$$

Figure 3:
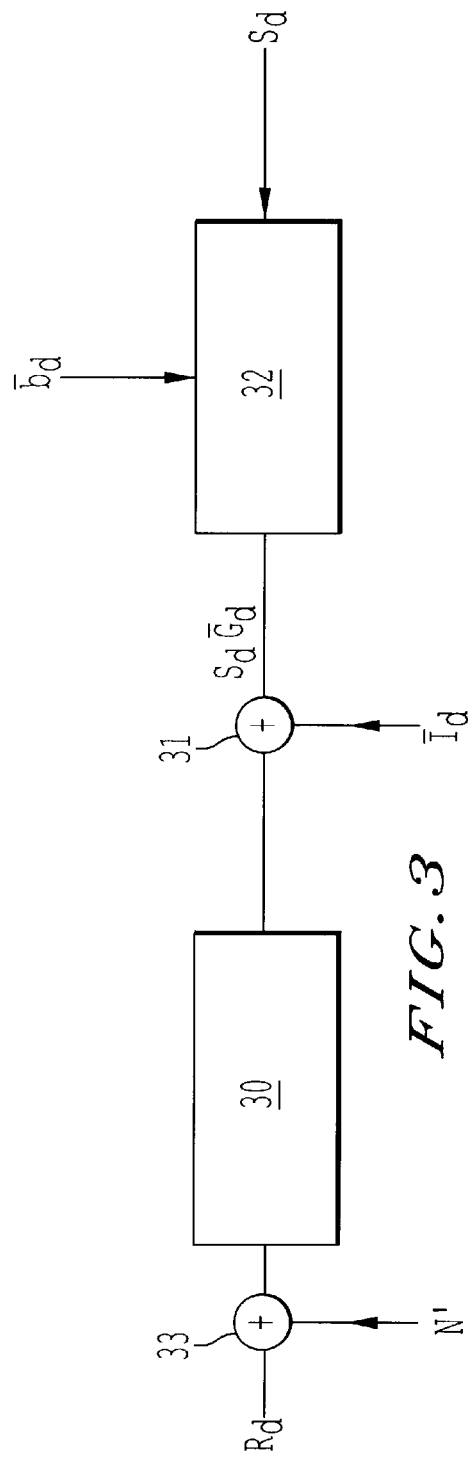
FIG. 3 depicts schematically a downlink transmission channel in a mobile telecommunication system.

FIG. 3 depicts the assembly consisting of the downlink channel (30), the array of antennae (32) and the transmission weighting module (33). The effect of the noise has been represented by the addition at (31) of a directional noise $\overline{I}_d$ due to the interfering signals and at (34) by a centred isotropic white Gaussian background noise N'.

Just like the uplink channel, the downlink channel can be modelled by a vector of dimension M, defined as the angular sampling of the transfer function of this channel in the directions, $\theta_k$, $k = 0, \ldots, M-1$ and denoted $\overline{C}_d = (c_{d0}, c_{d1}, \ldots, c_{dM-1})^T$. This vector has P' from amongst M non-zero coefficients, where P' is the number of propagation paths of the channel. For these P' coefficients $c_{dK}$, $c_{dK} = \alpha_{dK} \cdot \exp{-j(2\pi f_d \cdot L_{dK}/c + \phi_{dK})}$ where $L_{dK}$ is the length of the path concerned, $\alpha_{dK}$ the coefficient of attenuation of the signal propagating on the said path and $\phi_{dK}$ the polarisation of the incident signal.

The signal $R_d$ received by the mobile terminal can be written:

$$R_d = \overline{C}_d^T \cdot (S_d \cdot \overline{G}_d + \overline{I}_d) + N' \quad (17)$$

where $\overline{G}_d$ is the transmission gain vector and $S_d$ is the signal transmitted by the base station.

The ratio of signal to noise plus interference is:

$$(C/(I+N))_u = \frac{E(|\overline{C}_d^T \cdot S_d \overline{G}_d|^2)}{E(|\overline{C}_d^T \cdot \overline{I}_d|^2) + E(|N|^2)} = \frac{P_d |\overline{C}_d^T \cdot \overline{G}_d|^2}{N'_0 + I_d \cdot \sum_{k=0}^{M-1} \sigma_{dk}^2 |c_{dk}|^2} \quad (18)$$

where $P_d$ is the power of the signal $S_d$, and $N'_0$ is the power of the background noise, and where $\overline{I}_d = \sqrt{I_d} \overline{I}_d^0$ where $\overline{I}_d^0$ is the standardised vector whose components are assimilated to standardised centred random Gaussian variables $N(0,\sigma_{dk}^2)$, that is to say such that $$\sum_{k=0}^{M-1} \sigma_{dk}^2 = 1$$

and where $I_d = E(\|\overline{I}_d\|^2)$ is the total power of the directional noise (that is to say of the interference on the downlink channel). It was assumed in (18) that the isotropic noise was independent of the directional noise.

Expression (18) can also be written:

$$(C/I+N)_d = \frac{P_d}{I_d} \cdot \frac{|\overline{\Lambda}_d^T \overline{\Omega}_d|^2}{\|\overline{\Lambda}_d\|^2} \quad (19)$$

where $\overline{\Omega}_d = D_d^{-1} \cdot \overline{G}_d$, $\overline{\Lambda}_d = D_d \overline{C}_d$ and $D_d = \text{Diag}(\sqrt{\sigma_{dk}^2 + \gamma_d N'_0/I_d})$ with $\gamma_d = 1/\|\overline{C}_d\|^2$. Expression (19) is maximum for $\overline{\Omega}_d = \overline{\Lambda}_d^*$ and therefore for $$\overline{G}_d = D_d \overline{\Lambda}_d^* = D_d^2 \overline{C}_d^* \quad (20)$$

The transmission weighting vector, $\overline{b}_d$, optimum in the sense of the maximisation of the ratio of signal to noise plus interference on the downlink channel, can then be expressed as $$\overline{b}_d = H_d^+ \cdot D_d \overline{\Lambda}_d^* = H_d^+ \cdot D_d^2 \overline{C}_d^* \quad (21)$$

If it is assumed that the transfer function of the downlink channel is identical to that of the uplink channel, that is to say if $\overline{C}_d = \overline{C}_u$, it is possible to derive from (16) and (21) the relationship between the optimum weighting vectors $\overline{b}_d$ and $\overline{b}_u$:

$$\overline{b}_d = H_d^+ \cdot D_d^2 \cdot D_u^2 \cdot H_u \overline{b}_u \quad (22)$$

It should be noted that equation (11) is a particular case of equation (22) when $D_d = D_u^{-1}$. This will be the case in particular if the noise on the uplink channel and the noise on the downlink channel consist solely of isotropic noise.

The matrix $D_u$ can be estimated at the base station from a measurement of the noise power and the interference in the directions $\theta_k$. On the other hand the matrix $D_d$ cannot be estimated as simply.

The matrix $D_u$ can be estimated at the base station from a measurement of the noise power and the interference in the directions $\theta_k$, for example during a period of silence of the mobile terminal. On the other hand the matrix $D_d$ cannot be estimated as simply.

Let it be stated that $$D_d = \text{Diag}(\sqrt{\sigma_{dk}^2 + \gamma_d N'_0/I_d}) \text{ with } \gamma_d = 1/\|\overline{C}_d\|^2 \quad (23)$$

$\gamma_d$ can be estimated by the mobile terminal and transmitted over the uplink channel to the base station. Since $\gamma_d$ changes only slowly over time, the quantity of information to be transmitted relating to this parameter will be small.

Advantageously, it will be assumed that the power transfer coefficient does not depend on the frequency and is identical for the downlink channel and the uplink channel, namely $\|\overline{C}_d\|^2 = \|\overline{C}_u\|^2 = 1/\Gamma$. This assumption will in particular be verified if $\overline{C}_d = \overline{C}_u$. The value of $\Gamma$ can then be estimated directly by the base station, for example at the power control loop.

It is also possible to estimate the power of the interference in the direction $\theta_k$, that is to say $I_d \cdot \sigma_{dk}^2$, by expressing the fact that it is due to the transmission in the direction k of signals intended for mobile terminals $TS_j$ other than the one considered, that is to say $TS_{j_0}$. Because of the overlap of the transmission gain diagrams for the signals intended for the mobile terminals $TS_j$ on the one hand and the mobile terminal $TS_{j_0}$ on the other hand and the lack of orthogonality between these signals, the interference power attributable to the mobile terminals $TS_j$ in the direction $\theta_k$ can be written:

$$I_d(j_0) \cdot \sigma_{dk}^2(j_0) = \beta_d(j_0) \cdot \sum_{j \neq j_0} |S_d(j)|^2 \cdot |g_{dk}(j)|^2 \quad (24)$$

where the indices between parentheses have been added so as to distinguish the quantities relating to the different downlink channels (that is to say intended for the different mobile terminals) and where:

$\beta_d(j_0)$ is the coefficient of orthogonality of the downlink channel, destined for $TS_{j_0}$;

$S_d(j)$ is the power of the transmission signal destined for the terminal $TS_j$;

$g_{dk}(j)$ is the kth coefficient of the gain vector $\overline{G}_d(j)$ relating to the transmission to $TS_j$.

If it is assumed that the coefficient of orthogonality of the downlink channel, $\beta_d(j_0)$, is little different from that of the uplink channel, $\beta_u(j_0)$, the above three quantities are available at the base station without a return of information by the mobile terminal being necessary. As seen above, the power transfer coefficient, $\gamma_d(j_0)$, is transmitted to the base station on the uplink channel from $TS_{j_0}$ or directly estimated by the latter. It is therefore possible to obtain the matrix $D_d$ for a slight additional cost in terms of conveyance resources.

The only quantity in equation (24) liable to vary rapidly over time is the power of the transmission signals $S_d(j)$. In the case of a transmission in DS-CDMA mode, it will for example be possible to update these power values at each transmission slot.

It should be stated that equation (22) was obtained under the initial assumption of equality of the transfer functions of the downlink channel and uplink channel, that is to say: $\overline{C}_d = \overline{C}_u$.

If this identity is not satisfied, the vector $\overline{b}_d$ given by equation (22) is no longer optimum, that is to say no longer supplies the best ratio of signal to noise plus interference.

The ratio obtained is expressed from equations (18), (20) in the form:

$$(C/(I+N))_d = \frac{P_d}{I_d} \cdot \frac{|\overline{C}_d^T \overline{G}_d|^2}{\|\overline{\Lambda}_d\|^2} = \frac{P_d}{I_d} \cdot \frac{|\overline{C}_d^T D_d^2 D_u^2 \overline{C}_u^*|^2}{\|D_d \overline{C}_d\|^2} \quad (25)$$

where it is indeed found that the ratio is maximum for $\overline{C}_d = \overline{C}_u$.

Assuming now that the transfer functions of the uplink and downlink channels are random functions, this then gives:

$$(C/(I+N))_d = \frac{P_d}{I_d} \cdot \frac{E(|\overline{C}_d^T D_d^2 D_u^2 \overline{C}_U^*|^2)}{E(\|D_d \overline{C}_d\|^2)} \quad (26)$$

If the isotropic noises are disregarded, the numerator of (26) can be written:

$$E(|\overline{C}_d^T D_d^2 D_u^2 \overline{C}_u^*|^2) = E\left(\left|\sum_{k,k'} \sigma_{dk}^2 \cdot \sigma_{uk'}^2 \cdot c_{dk} \cdot c_{uk'}^*\right|^2\right) \quad (27)$$

If it is assumed that:

$$E(c_{dk1} \cdot c_{dk'1}^* \cdot c_{uk2} \cdot c_{uk2}^*) = \alpha_{dk1}^2 \cdot \alpha_{uk2}^2 \delta(k_1 - k_1') \cdot \delta(k_2 - k_2') \quad (28)$$

with $\alpha_{dk1}^2 = E(\alpha_{dk1}^2)$ and $\alpha_{uk1}^2 = E(\alpha_{uk2}^2)$
that is to say if:
- the distribution of the phases and the distribution of the amplitudes of $c_{dk}$ are independent and the same applies to $c_{uk}$;
- the paths of the uplink and downlink channels relating to different directions have statistically decorrelated lengths $L_{dk}$ and $L_{dk'}$;

the numerator of (26) is then written:

$$E(|\overline{C}_d^T D_d^2 D_u^2 \overline{C}_u^*|^2) = \sum_{k1,k2} \sigma_{dk1}^4 \sigma_{uk2}^4 \cdot a_{dk1}^2 \cdot a_{uk2}^2 \quad (29)$$

and in the optimum case:

$$E(|\overline{C}_d^T D_d^2 D_u^2 \overline{C}_u^*|^2) = E\left(\left(\sum_{k=0}^{M-1} \sigma_{dk}^2 \sigma_{uk}^2 \cdot a_k^2\right)^2\right) \quad (30)$$

with $\alpha_k^2 = \alpha_{uk}^2 = \alpha_{dk}^2$ if it is assumed that the propagation paths are identical for the uplink channel and downlink channel.

The equation can then be written:

$$(C/I) = \gamma \cdot (C/I)_{opt}. \text{ with } \gamma = \frac{\sum_{k1,k2} \sigma_{dk1}^4 \sigma_{uk2}^4 \cdot a_{dk1}^2 \cdot a_{uk2}^2}{E\left(\left(\sum_{k=0}^{M-1} \sigma_{dk}^2 \sigma_{uk}^2 \cdot a_k^2\right)^2\right)} \le 1 \quad (31)$$

which represents the loss in performance compared with the optimum.

Figure 4:
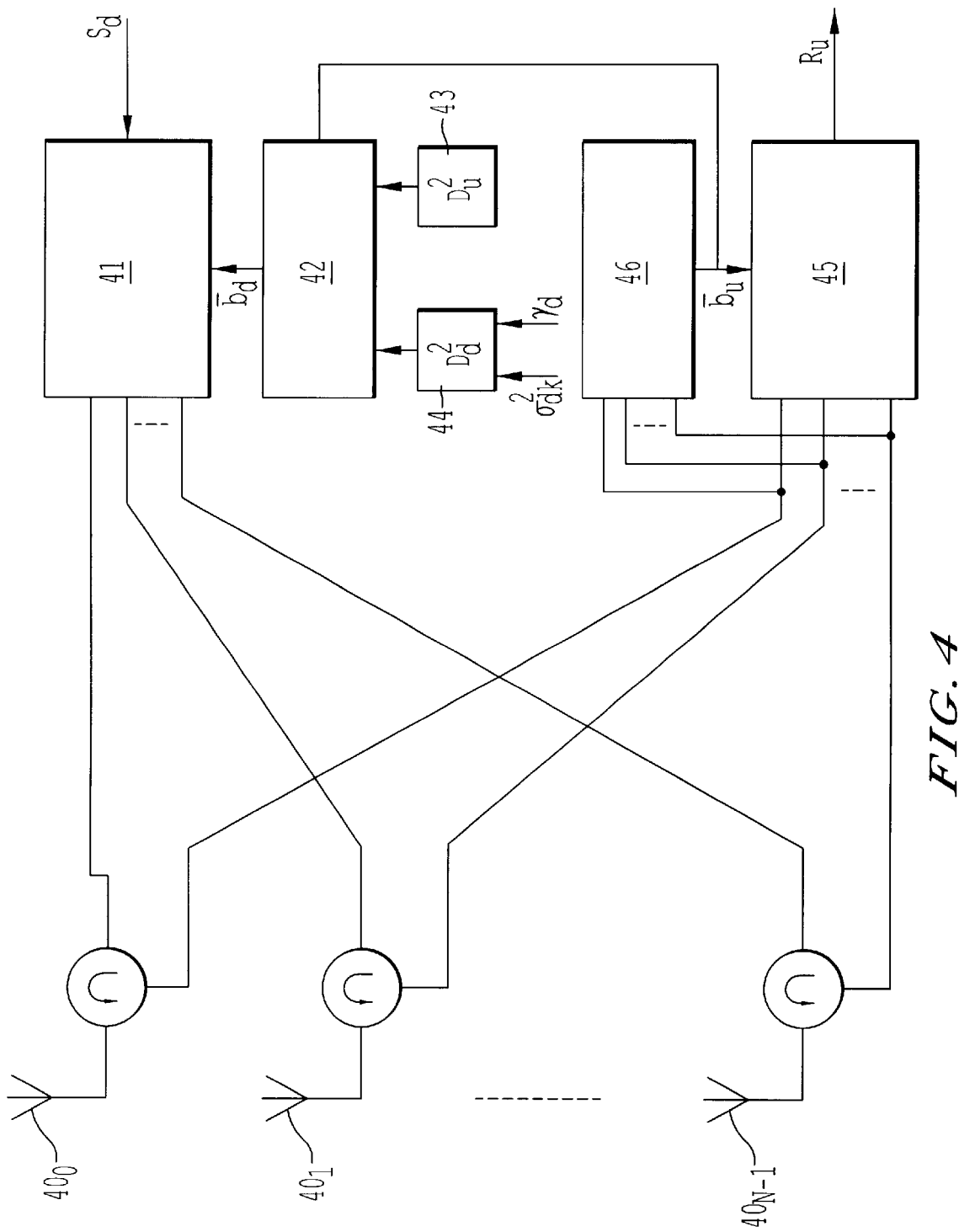
FIG. 4 depicts schematically a device for obtaining an antenna gain function according to one embodiment of the invention.

FIG. 4 illustrates an example of a device according to one embodiment of the invention. For reasons of simplicity, the processing of a single communication with a mobile terminal has been depicted. The device, installed at the base station, comprises an array of antennae (40₀),(40₁), . . . (40$_{N-1}$) coupled by means of duplexers to a first reception weighting module (45), weighting the signals received by the different antennae by means of a first weighting vector, $\overline{b}_u$, and to a second transmission weighting module (41), weighting a signal to be transmitted by a second weighting vector, $\overline{b}_d$. When the device manages several communications with a plurality of mobile terminals, other weighting modules identical to the modules (41), (45) must be provided in parallel with these. The N outputs of antennae are directed to a module (46) estimating, in a manner known per se, the optimum weighting vector $\overline{b}_u$. Estimators of the noise power matrices (43) and (44) estimate respectively the matrices $D_u^2$ and $D_d^2$. The matrices $D_u^2$ and $D_d^2$ are supplied to a matrix calculation module (42) which calculates the vector $\overline{b}_d$ from the vector $\overline{b}_u$ according to equation (22). The vector $\overline{b}_d$ is then transmitted to the weighting module (41). The matrix $D_d^2$ is evaluated in (44) by means of equation (23). To do this, the estimation module (44) receives an estimation of the coupling coefficient, $\gamma_d$ or $\Gamma$ according to circumstances, as well as interference powers $\sigma_{dk}^2$ in the directions $\theta_k$ and the total power $I_d$. The values $\sigma_{dk}^2$ are advantageously calculated from equation (24) using the values of the transmission signals, $S_d(j)$, $j \ne j_0$, intended for the mobile terminals other than the one in question ($j_0$) and the gain vectors, $\overline{G}_d(j)$, $j \ne j_0$, which are associated with them.

Although the device described above has been depicted schematically in the form of functional modules, it goes without saying, however, that the various functions executed can be executed by means of a processor programmed for this purpose or by a plurality of dedicated processors.

What is claimed is:

1. Method of obtaining a transmission gain function for an array of antennae communicating with a telecommunication terminal, signals received or transmitted from said array of antennae being weighted by weighting vectors $\overline{b}$ having N complex coefficients, N being a number of the antennae in the array, the array transmitting to the telecommunication terminal on an downlink channel a downlink transmission signal $S_d$, the telecommunication terminal transmitting to the array on an uplink channel an uplink transmission signal $S_u$, the uplink channel being disturbed by a first isotropic noise $N_u$ and/or a first directional noise referred to as an uplink interference $I_u$, and the downlink channel being disturbed by a second isotropic noise $N_d$ and/or a second directional noise referred to as a downlink interference $I_d$, comprising:

determining a first weighting vector $\overline{b}_u$ maximizing on reception by the array a ratio $(C/(I_u+N_u))_u$ of a received signal coming from the telecommunication terminal to a noise plus interference disturbing the uplink channel; and calculating from said first weighting vector $\overline{b}_u$ a second weighting vector $\overline{b}_d$ maximizing on reception by the telecommunication terminal a ratio $(C/(I_d+N_d))_d$ of a received signal coming from the array to a noise plus interference disturbing the downlink channel, said second weighting vector is in the form of a matrix product comprising a first noise matrix $D_u$ which is a function of a power of the first isotropic noise and/or a power of the first directional noise and a second noise matrix $D_d$ which is a function of a power of the second isotropic noise and/or a power of the second directional noise.

2. Method of obtaining a transmission gain function according to claim 1, wherein the first weighting vector $\overline{b}_u$ is obtained for a first working frequency $f_u$ of the array and the second weighting vector $\overline{b}_d$ is obtained for a second working frequency $f_d$ of the array.

3. Method of obtaining a transmission gain function according to claim 2, wherein a gain function is represented by a gain vector $\overline{G}$ of M complex samples of said gain function taken in M distinct directions k, the gain vector $\overline{G}$ being expressed as a product of the second weighting vector $\overline{b}_d$ and a transformation matrix dependent on the second working frequency of the array, and the second weighting vector $\overline{b}_d$ is obtained from the first weighting vector $\overline{b}_u$ by:

$$\overline{b}_d = H_d^+ \cdot D_d^2 \cdot D_u^2 \cdot H_u \cdot \overline{b}_u$$

where $H_u$ is the transformation matrix at the frequency $f_u$, $H_d^+$ is the pseudo-inverse matrix of the matrix $H_d$, $H_d$ is the transformation matrix at the frequency $f_d$, $D_u$ is the first noise matrix, and $D_d$ is the second noise matrix.

4. Method of obtaining a transmission gain function according to claim 3, wherein the first noise matrix is a diagonal matrix of size M×M and of components $\sqrt{\sigma_{uk}^2 + \gamma_u N_0/I_u}$, where $\sigma_{uk}^2$ is a power of the uplink interference in a direction k, $I_u$ is a total power of the uplink interference, and $N_0$ is a power of the first isotropic noise, $\gamma_u = 1/\|\overline{G_u}\|^2$ where $\overline{G_u} = H_u \overline{b_u}$.

5. Method of obtaining a transmission gain function according to claims 3 or 4, wherein the second noise matrix is a diagonal matrix of size M×M and of components $\sqrt{\sigma_{dk}^2 + \gamma_d N'_0/I_d}$, where $\sigma_{dk}^2$ is a power of the downlink interference in the direction k, $N'_0$ is a power of the second isotropic noise, $\gamma_d = 1/\|\overline{C_d}\|^2$ where $\overline{C_d}$ is a vector consisting of samples of a transfer function of the downlink channel taken in the M directions, and $I_d$ is a total power of the downlink interference.

6. Method of obtaining a transmission gain function according to claims 3 or 4, wherein the array is configured to transmit on a plurality of downlink channels a plurality of transmission signals to a plurality of telecommunication terminals and receives from the telecommunication terminals a plurality of transmission signals transmitted on a plurality of uplink channels, each downlink channel j relating to a terminal j in the plurality of downlink channels and associated with one of a set of second weighting vectors $\overline{b}_d(j)$, the second noise matrix relating to the downlink channel j is a diagonal matrix of size M×M and of components $\sqrt{\sigma_{dk}^2(j) + \gamma_d(j) \cdot N'_0/I_d(j)}$, where $\sigma_{dk}^2(j)$ is a power of the downlink interference for a downlink channel j in the direction k, $\gamma_d(j)$ is a coefficient characterizing a power transfer on the downlink channel j, $N'_0$ is a power of the second isotropic noise, and $I_d(j)$ is a total power of the downlink interference for each channel j.

7. Method of obtaining a transmission gain function according to claim 6, wherein the downlink interference power is in the direction k, and $\sigma_{dk}^2(j)$ is estimated according to a power of signals $S_d(j')$ transmitted on downlink channels j' distinct from the downlink channels j by:

$$I_d(j) \cdot \sigma_{dk}^2(j) = \beta_d(j) \cdot \sum_{j' \neq j} |S_d(j')|^2 \cdot |g_{dk}(j')|^2$$

where $\beta_d(j)$ is an orthogonality coefficient of the downlink channel j and $g_{dk}(j')$ is the $k^{th}$ coefficient of a gain vector $\overline{G}_d(j') = H_d \overline{b}_d(j')$ relating to the downlink channel j'.

8. Method of obtaining a transmission gain function according to claim 7, wherein the coefficient $\beta_d(j)$ is estimated from a coefficient characterizing an orthogonality of an uplink channel j.

9. Method of obtaining a transmission gain function according to one of claim 8, wherein the coefficient $\gamma_d(j)$ is transmitted to the array by a terminal j over an associated uplink channel.

10. Method of obtaining a transmission gain function according to one of claim 7, wherein the coefficient $\gamma_d(j)$ is transmitted to the array by a terminal j over an associated uplink channel.

11. Transmission/reception device for a base station in a mobile telecommunication system, comprising:
    an array of N antennae;
    means for weighting signals received by the array by a first weighting vector $\overline{b}_u$;
    means for weighting signals to be transmitted by the array by a second weighting vector $\overline{b}_d$;
    means for determining said first weighting vector $\overline{b}_u$ which maximizes a ratio of signal to noise and interference on reception; and
    means for obtaining a transmission gate function adapted to implement the method according to any one of claims 1, 2, 3, and 4, the means for obtaining the transmission gain function supplying the second weighting vector $\overline{b}_d$ to said means for weighting the signals.

* * * * *